United States Patent [19]

Peoples, Jr.

[11] Patent Number: 4,568,581
[45] Date of Patent: Feb. 4, 1986

[54] MOLDED THREE DIMENSIONAL FIBROUS SURFACED ARTICLE AND METHOD OF PRODUCING SAME

[75] Inventor: Clarence A. Peoples, Jr., Rockwell, N.C.

[73] Assignee: Collins & Aikman Corporation, New York, N.Y.

[21] Appl. No.: 649,680

[22] Filed: Sep. 12, 1984

[51] Int. Cl.⁴ .......................... B32B 3/20; D04H 1/48; D04H 1/54
[52] U.S. Cl. ........................................ 428/35; 19/302; 264/119; 264/122; 264/126; 264/241; 264/258; 296/1 R; 428/212; 428/286; 428/296; 428/300; 428/409; 428/913
[58] Field of Search ................. 428/296, 35, 212, 286, 428/300, 409, 913; 264/119, 122, 126, 241, 258; 156/62.6; 19/302

[56] References Cited

U.S. PATENT DOCUMENTS

| | | | |
|---|---|---|---|
| 2,483,405 | 10/1949 | Francis | 428/296 |
| 4,195,112 | 3/1980 | Sheard et al. | 264/122 |
| 4,258,093 | 3/1981 | Benedyk | 428/296 |
| 4,298,643 | 11/1981 | Miyogawa et al. | 264/324 |
| 4,315,965 | 2/1982 | Mason et al. | 428/296 |
| 4,324,752 | 4/1982 | Newton et al. | 264/126 |
| 4,342,813 | 8/1982 | Erickson | 264/126 |
| 4,359,132 | 11/1982 | Parker et al. | 264/126 |
| 4,373,001 | 2/1983 | Smith et al. | 428/234 |
| 4,474,846 | 10/1984 | Doerer et al. | 428/288 |

Primary Examiner—James C. Cannon
Attorney, Agent, or Firm—Bell, Seltzer, Park & Gibson

[57] ABSTRACT

Three dimensional molded articles suitable for use as fibrous surfaced panels for automobile trunk compartments and the like are produced by molding a heated non-woven web formed of a blend of relatively high melting fibers and relatively low melting thermoplastic fibers. The low melting fibers form a multiplicity of bonds which impart shape retentive rigidity to the nonplanar three dimensional web. A characteristic feature of the molded article is that the low melting fibers present at one surface of the web have a fibrous form, while the low melting fibers present at the opposite surface of the web have portions which exhibit a nonfibrous fused form and form said bonds.

19 Claims, 12 Drawing Figures

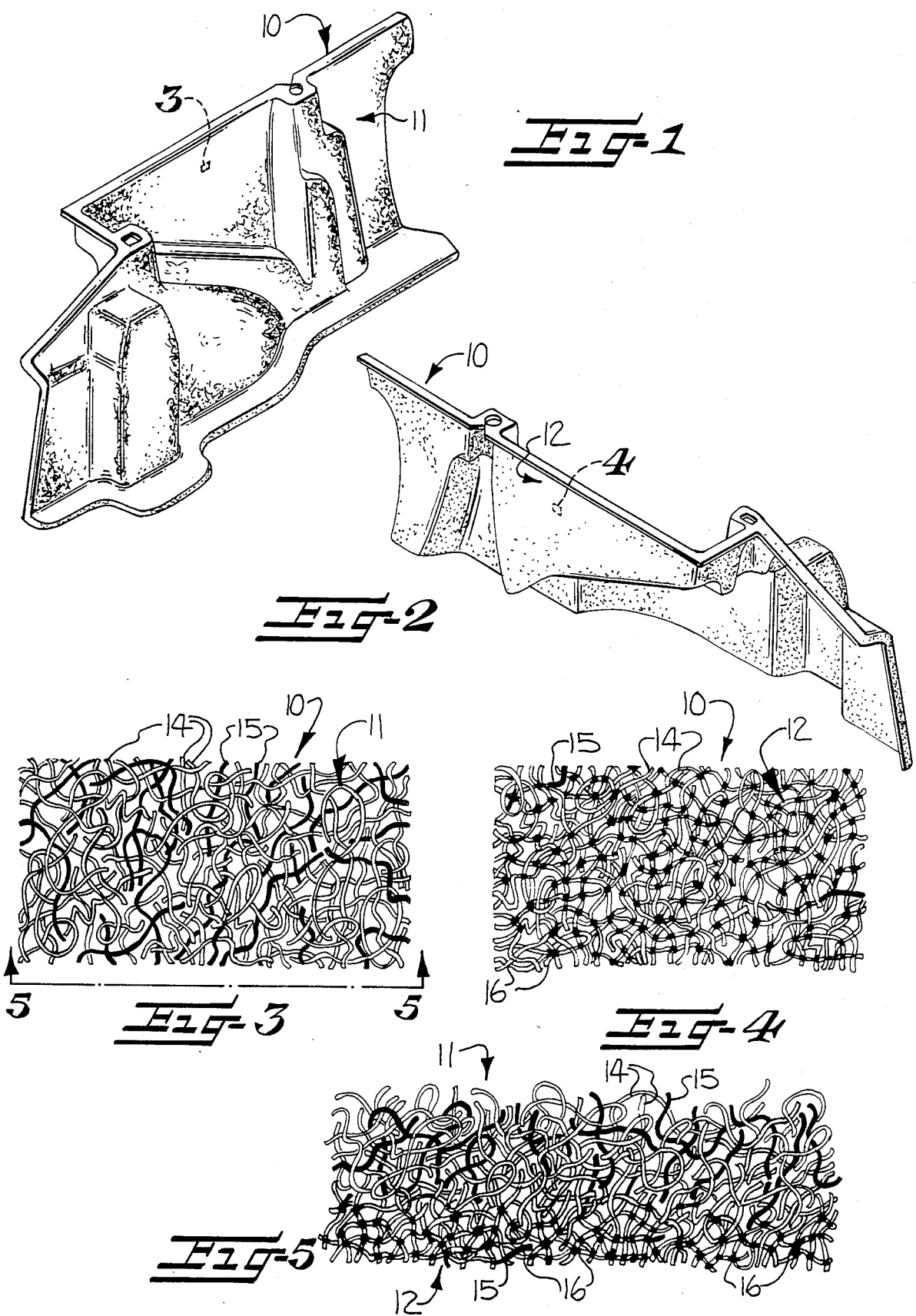

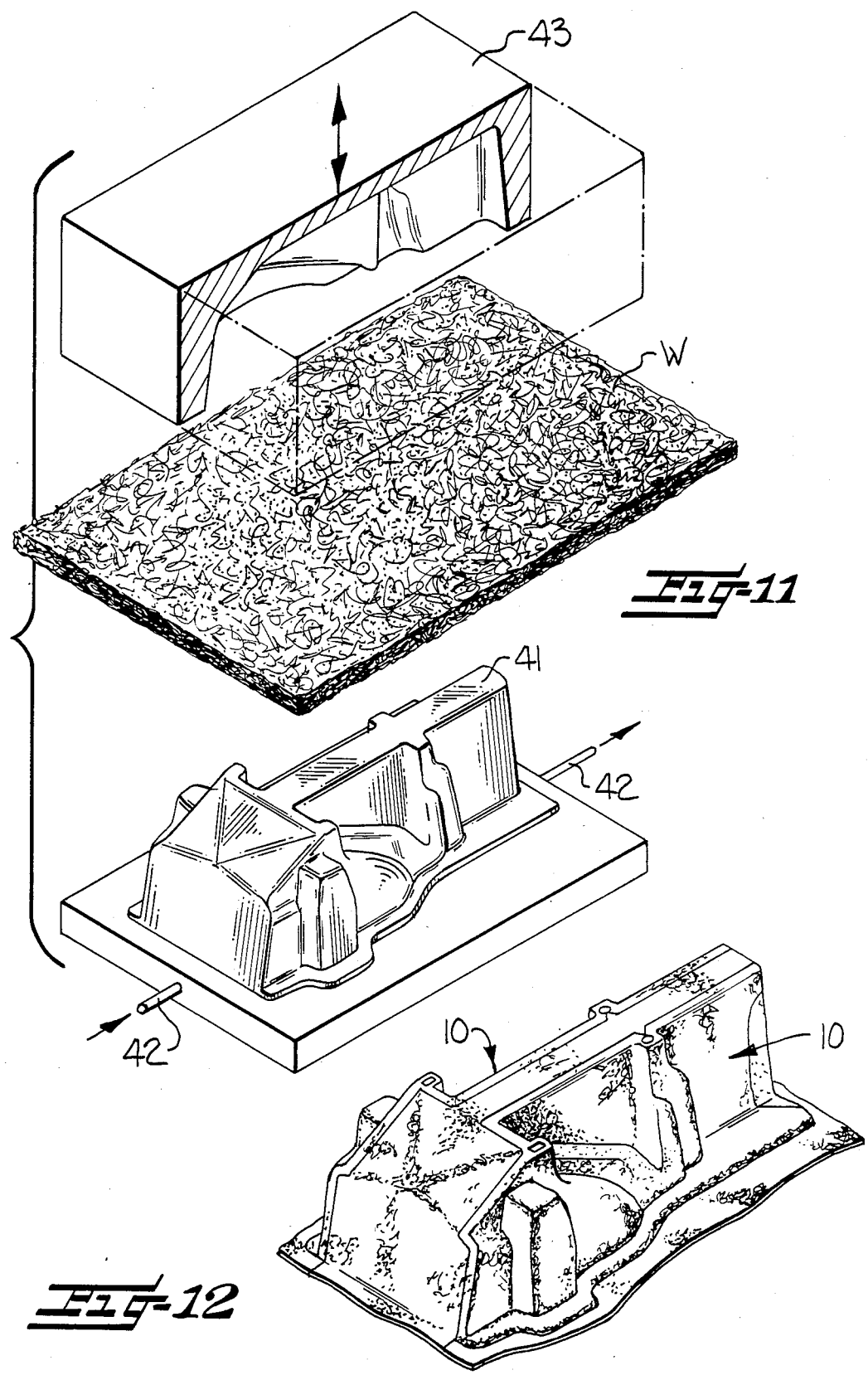

4,568,581

MOLDED THREE DIMENSIONAL FIBROUS SURFACED ARTICLE AND METHOD OF PRODUCING SAME

FIELD AND BACKGROUND OF THE INVENTION

This invention relates to an article of manufacture in the form of three dimensional molded fibrous sheet material, and to a method of producing such an article. The molded articles of this invention are particularly suited for use as fibrous surfaced panels for automobile trunk compartments and the like. Such molded articles must have a three dimensional configuration to conform to the irregular shapes present in an automobile trunk compartment, such as wheel wells, spare tire compartments, structural supports, and the like. It is also important that these molded articles retain the three dimensional configuration during normal use and when subjected to the heat and wear conditions ordinarily encountered in automobile trunk compartments.

Heretofore, molded fibrous surfaced articles produced for this purpose have been constructed of a plurality of layers, typically including a fibrous textile face layer and a backing layer to give the desired moldability, stiffness and shape retentive characteristics. For example, one known prior product of this type employs a needled nonwoven web with an extrusion coated film layer of a thermoplastic polymer such as polyethylene on the rear surface to give the necessary stiffness and moldability. One of the limitations and disadvantages of this type of prior product is its relative expense, and in some applications it does not provide the desired degree of shape retention. Examples of other molded articles of a layered construction are described in U.S. Pat. Nos. 4,172,166; 4,205,113; and 4,424,250.

One of the objects of the present invention is to provide an improved molded article having enhanced rigidity and shape retentive characteristics, and an aesthetically pleasing textile outer surface.

A further object of the present invention is to provide a molded article of the type described which can be produced at a more economical cost.

SUMMARY OF THE INVENTION

These and other objects of the present invention are achieved in accordance with the present invention in a three dimensional molded article which comprises a nonwoven web formed of a blend of relatively high melting fibers and relatively low melting thermoplastic fibers. The nonwoven web includes molded areas which define a three dimensional configuration to the article, and the low melting fibers form a multiplicity of bonds which impart a shape retentive rigidity to the article. A characteristic feature of the three dimensional molded fibrous article of this invention is that the low melting fibers are present on one surface of the molded article in a fibrous form and present a textile surface appearance and hand to the molded article while at the opposite surface of the molded article the low melting fibers have portions which exhibit a nonfibrous fused form and create bonds which give the molded article its shape retentive characteristics.

The nonwoven web which is used in the molding of the fibrous article is of a substantially homogeneous construction throughout, and the above-described differing characteristics on opposite faces of the molded article, which give the article its rigidity and shape retentive characteristics, are produced during the molding operation, and without the necessity of providing a separate backing layer. The product of the present invention may be thus characterized as a "self-faced" product in that it is of a unitary construction and during molding forms its own stiffening "backing" layer.

In the preferred embodiments of the present invention, the nonwoven web from which the molded article is formed comprises a needled blend of high melting polyester fibers and low melting polyethylene fibers, with the high melting polyester fibers comprising the major fibrous component of the article. Desirably, the relatively low melting thermoplastic fibers have a melting temperature of at least 150° F. less than the high melting fibers, and the web has an elongation in the machine and cross directions of at least 20 percent to enable it to be deep drawn during molding to form the three dimensional articles.

A particularly advantageous feature of the molded article of this invention is that is is capable of being molded to form deep drawn areas, wherein during the molding operation the fibrous material itself is stretched and drawn to form deep recesses or relief portions. The deep drawn areas have a density lower than the density in other areas of the molded article, yet retain the desired rigidity and shape retentive characteristics.

The present invention also provides a method of producing a shape retentive three dimensional molded fibrous article suitable for use as fibrous surfaced panels for automobile trunk compartments and the like, which comprises (a) forming a nonwoven web comprising a blend of relatively high melting fibers and relatively low melting thermoplastic fibers;

(b) heating one side of the web to a temperature greater than the temperature on the opposite side thereon and sufficient to melt the low melting thermoplastic fibers;

(c) compressing the heated web in a three dimensional mold to thereby form the web into a three dimensional configuration and to form bonds with the molten fibers present on the more heated surface of the web to impart rigidity and shape retentive characteristics to the molded article while leaving the fibers present on the opposite surface in a fibrous form and presenting a fibrous textile surface to the article; and (d) removing the molding article from the mold.

BRIEF DESCRIPTION OF THE DRAWINGS

Some of the features and advantages of the invention having now been generally described, others will become apparent from the detailed description which follows, when taken in connection with the accompanying drawings, in which FIGS. 1 and 2 are perspective views of a molded article in accordance with the invention, showing the front and rear sides thereof respectively;

FIG. 3 is an enlarged microscopic view of the front surface of the molded article taken from the area indicated at 3 in FIG. 1;

FIG. 4 is a view similar to FIG. 3, but showing the area indicated at 4 in FIG. 2 on the rear surface of the molded article;

FIG. 5 is a cross-sectional view thereof taken substantially along the line 5—5 of FIG. 3;

FIG. 11 is an exploded perspective view illustrating an apparatus for molding the nonwoven web; and FIG. 12 is a perspective view of the molded fibrous article produced by the apparatus of FIG. 11.

DESCRIPTION OF ILLUSTRATED EMBODIMENTS

Figure 6:
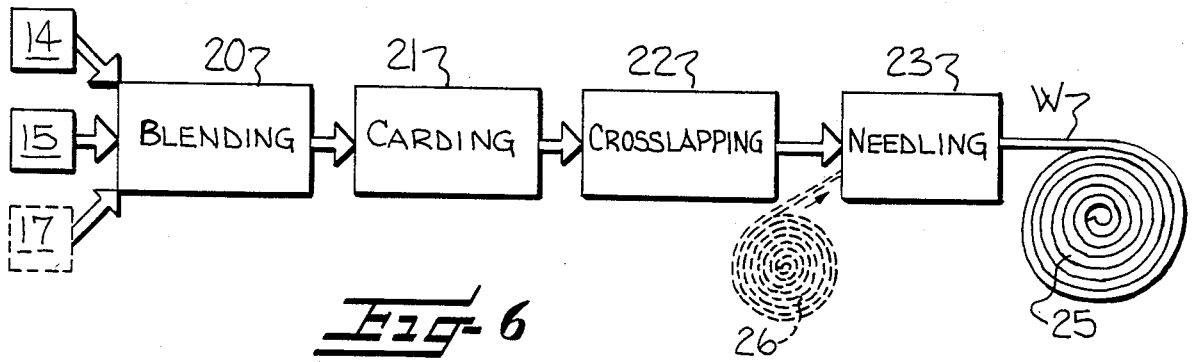
FIG. 6 is a block schematic diagram illustrating the method of making the nonwoven fibrous web.

While the present invention will be described more fully hereinafter with reference to the accompanying drawings, in which particular embodiments of the present invention are shown, it is to be understood at the outset of the description which follows that persons of ordinary skill in the appropriate arts may modify the invention here described while still achieving the favorable results of this invention. Accordingly, the description which follows is to be understood as a broad, teaching disclosure directed to persons of skill in the appropriate arts, and not as limiting upon the present invention.

Referring now more specifically to the drawings, FIGS. 1 and 2 illustrate a three dimensional molded article 10 in accordance with the present invention. The particular molded article illustrated is intended for use as a fibrous surfaced panel for the interior of an automobile trunk compartment for covering the wheel well area of the trunk. The front or outer side of the molded article 11 is shown in FIG. 1, while the back or inner side 12 is shown in FIG. 2. The molded article 10 has a rather complex three dimensional shape, and includes a number of areas where severe changes in direction occur or where a very significant amount of molding or drawing occurs during the formation of the article in a mold.

The three dimensional molded article 10 is formed from a nonwoven sheet material or web of a unique construction and composition which provides for readily molding the web into complex shapes such as those shown, and which cause the web to develop stiffness and shape-retentive characteristics upon molding.

Specifically, the nonwoven web is formed from a needled blend of two or more different types of fibers, including relatively high melting fibers, and relatively low melting thermoplastic fibers which, when heated, form bonds and serve to bind together the fibers and provide the desired stiffness and shape retention characteristics. The high melting fibers preferably comprise the major fibrous component of the blend, and they may be blended with one or more types of lower melting thermoplastic fibers, such as linear low density polyethylene, high density polyethylene fibers, polypropylene fibers, lower melting polyesters, polyester copolymers such as PETG, polyamides and copolyamides or terpolyamides such as a terpolymer of nylon 6-66 and 610 sold under the trademark ELVAMIDE by Du Pont ethylene copolymers such as EVA or EAA. The preferred low melting fibers for use in this invention are polyethylene fibers, either linear low density or high density, which are typically blended with the high melting polyester fibers at a rate of from about 20% to about 70% by weight. Optionally, other low melting fibers may be added to the blend, however, in the preferred construction the polyethylene fibers are the predominant low melting fiber.

Suitable high melting fibers include polyesters, nylon, glass, Nomex, and Kevlar. Desirably, there is a substantial difference between the melting points of the low melting thermoplastic fibers and the high melting fibers. The low melting thermoplastic fibers should most desirably have a melting temperature of at least 150° F. less than the high melting fibers. The preferred high melting fiber for the present invention are polyester fibers. The fibers may be suitably colored with the use of dyes, or by the incorporation of pigments into the polymer, as is conventional.

The front or outer surface of the molded article has a fibrous felt-like textile feel and appearance. An enlarged microscopic view of the front surface of the article 10 is shown in FIG. 3. In the embodiment illustrated, the fibrous web is formed of a blend of high melting polyester fibers 14 and low melting polyethylene fibers 15. In order to distinguish the two kinds of fibers in FIG. 3, the high melting fibers 14 are shown in white and the low melting polyethylene fibers 15 are shown in black. However, it will be understood that in practical commercial application, the two kinds of fibers may either be of the same or of differing colors. It will be seen from FIG. 3 that both kinds of fibers are distributed throughout the surface of the article in a substantially random arrangement. On the front surface 11 of the article, both the high melting fibers and the low melting fibers exhibit a fibrous form. On the back surface 12 of the article, however, as shown in FIG. 4, the low melting fibers 15 have portions which have melted and fused to form bonds 16, and in so doing have lost their fibrous form. The fusion bonds 16 are located at the fiber cross-over points where two or more fibers come into contact with one another. These fusion bonds impart stiffness and rigidity to the nonwoven fibrous web, so that it will retain the three dimensional shape imparted thereto by molding.

From the cross-sectional view of FIG. 5 it will be seen that the fusion bonds 16 are located predominantly adjacent to the inner or back surface 12 of the article, while on the front side 11 very few, if any, fusion bonds are found and the high melting and low melting fibers present an aesthetically pleasing felt-like textile surface in which the individual fibers are secured into the article but are substantially free to move relative to one another on the surface of the article to give it the desirable textile hand characteristics. The rear surface 12 may have a somewhat harder crusty hand, depending upon the amount of heating, but still has the appearance of a felt-like textile article.

FIG. 6 illustrates a suitable method for producing the nonwoven web from which the molded articles of the invention are formed. As shown, the high melting polyester fibers 14, the low melting polyethylene fibers 15, and an optional third fiber component 17 are blended together in a conventional textile fiber blending apparatus 20 to obtain a substantially homogeneous blend or mixture of the fibers. The blend of fibers is then directed through a textile carding machine 21 to form a thin gossamer card web which is thereafter directed through a cross-lapping apparatus 22 in which multiple layers of the gossamer card web are laid up on top of one another to produce a final web thickness of approximately ¼ to ¾ inches. The cross-lapped web is then directed through one or more needle looms, indicated generally by the reference character 23 which serve to densify and consolidate the cross-lapped web and produce a unitary nonwoven web material W which will hold its form during further handling. Typically, the cross-lapped web W may be subjected to needling of from 700 to approximately 900 penetrations per square inch. The thus formed needled nonwoven web W is thereafter wound up into rolls 25 for storage and further handling. Optionally, as indicated by the broken lines, one or more additional web components 26 may be combined with the cross-lapped web and combined therewith during needling to provide a different composition on the front or back surface of the needled web. Needled nonwoven webs suitable for use in forming molded automobile components may have a basis weight of at least 10 oz/yd.$^2$ and typically 20 to 30 oz/yd.$^2$.

Figure 7:
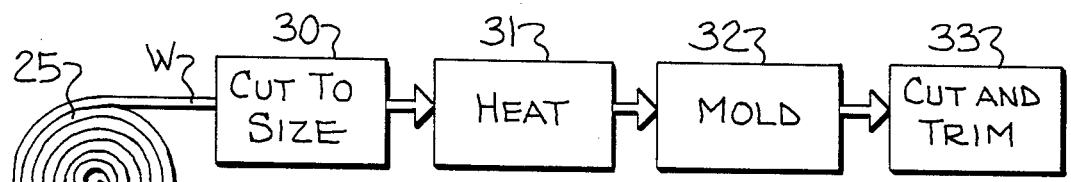
FIG. 7 is a block schematic diagram illustrating the method of molding the nonwoven web into a molded article.

The molding operation is schematically illustrated in FIG. 7. The web W from roll 25 is cut to size by suitable cutting apparatus indicated at 30, is directed through a heating chamber 31 where the web is heated to a temperature sufficient to activate the low melting thermoplastic fiber component, and the heated web is then placed in a mold 32 and subjected to pressure to form and mold the heated web into the desired three dimensional configuration. Following molding, the molded article is removed from the mold and cut and trimmed as necessary, at a trimming station 33.

Figure 8:
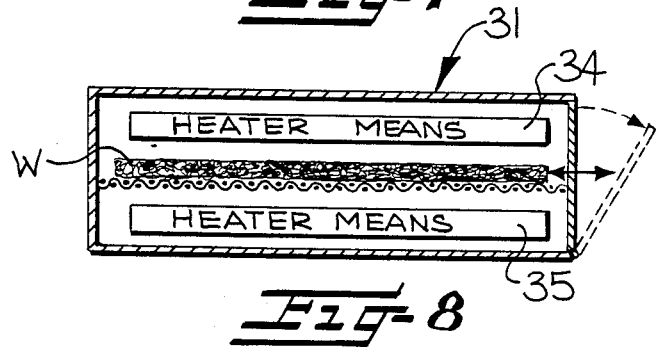
FIG. 8 is a schematic side cross-sectional view of an apparatus for heating the nonwoven web.
Figure 9:
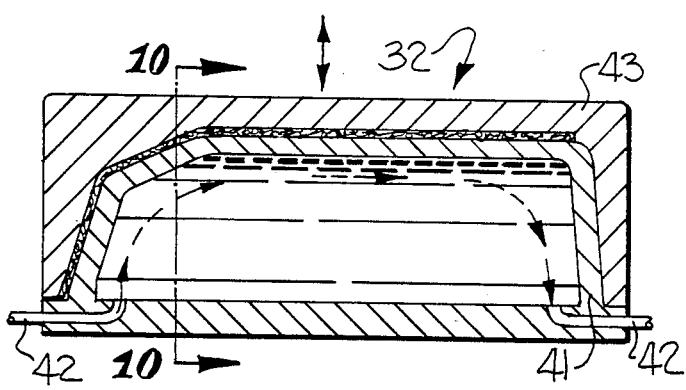
FIGS. 9 and 10 are cross-sectional views of a suitable apparatus for molding the nonwoven web.
Figure 10:
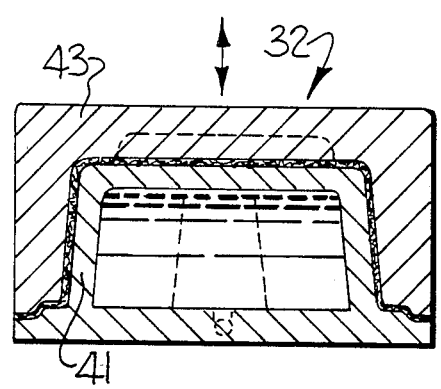

The heating is carried out in such a manner that one surface of the web is heated to a greater temperature than the opposite surface thereof. As illustrated in FIG. 8 for example, the heating chamber includes heating elements 34, 35 both above and below the web in order to quickly heat the web throughout, although heating may suitably be accomplished from one side only, if desired. When two sets of heating elements are employed, the heating elements 35 located one side of the web have a higher temperature and serve to heat the surface of the web to a greater temperature than that of the opposite surface.

After heating to the desired temperature, the heated web is quickly transferred to the mold 32. As illustrated, the lower or male half of the mold 41 which contacts the back side of the molded article is temperature controlled by the provision of suitable inlet and outlet fluid lines 42 for circulation of a heat transfer medium such as chilled water. The more heated surface of the web W is oriented downward toward the male mold member 41. When the cooperating mold halves 41, 43 are brought together, the web is stretched and drawn and formed into the configuration of the mold. In certain areas of the article, the web is stretched and drawn quite substantially, e.g. on the order of about 125%, whereas in other areas little or no drawing or stretching of the web takes place. As a result, the deep drawn areas are thinned out and have a reduced density as compared to the undrawn areas.

To accommodate the high degree of stretching which takes place during molding, the web is constructed so as to have high degree of elongation, preferably greater than 20%. More specifically, the griege web may typically have an elongation as high as about 75 to 80% in the machine direction and 45 to 55% in the cross machine direction in the unheated state. It will be appreciated that the heated web during molding would have even greater elongation properties.

During the molding operation, the more heated surface of the web is compressed and densified and the fibers present at this surface of the web are bonded together by the thermoplastic low melting fibers to impart stiffness and shape retentive properties to the article. However, the fibers which are present on the opposite surface of the web, which are heated to a lesser degree, are bonded together to a lesser extent with the result that portions of these fibers remain free to move and project from the surface of the molded article. The outer surface of the molded article thus retains a desirable felt-like textile surface appearance and feel.

EXAMPLE

A first sample nonwoven needled web (A) was produced from a blend of 55% by weight black pigmented polyethylene terephthalate fibers (15 d.p.f.) and 45% black pigmented high density polyethylene fibers by blending, carding and cross-lapping in a manner similar to that shown in FIG. 6 and described in connection therewith. A second sample web (B) was produced in a similar manner and of the same fiber composition except that the polyethylene terephthalate fibers were conventional white fibers rather than black. The thermal properties of the webs were measured to ascertain the melt temperatures and recrystallization temperatures of the fiber components. The results are shown in Table 1.

TABLE 1

| Non-woven web | Melt Temperatures | | | Recrystallization | | |
|---|---|---|---|---|---|---|
| | (HDPE) | (PET) | ΔT | (HDPE) | (PET) | ΔT |
| A | 270° F. | 478° F. | 208° F. | 226° F. | 369° F. | 143° F. |
| B | 273° F. | 489° F. | 216° F. | 226° F. | 372° F. | 146° F. |

The webs A and B were each heated and molded to form a three dimensional molded article, and samples were taken from several areas of the molded article. The basis weight, thickness and stiffness of the greige unmolded web and of the molded samples were measured and the results are shown in Table 2.

TABLE 2

| SAMPLE IDENTIFICATION | WEIGHT OZ/YD$^2$ | THICKNESS MILS | T-O* STIFFNESS | COMMENTS |
|---|---|---|---|---|
| A-1 | 21.2 | 250 | 15 | Greige |
| A-2 | 16.6 | 100 | 89 | High pressure area |
| A-3 | 20.0 | 200 | 61 | Low pressure area |
| A-4 | 22.9 | 150 | 65 | High pressure area but lower preheat |
| B-1 | 19.4 | 250 | 15 | Greige |
| B-2 | 17.4 | 100 | 44 | High pressure area |
| B-3 | 20.6 | 200 | 56 | Low pressure area |

*in-lbs. × 1000 to bend 10°

In the drawings and specification, there has been set forth a preferred embodiment of the invention, and although specific terms are employed, they are used in a generic and descriptive sense only and not for purposes of limitation.

That which is claimed is:

1. A three dimensional molded article suitable for use as fibrous surfaced panels for automobile trunk compartments and the like and comprising a nonwoven web formed of a blend of relatively high melting fibers and a relatively low melting thermoplastic fibers, said nonwoven web having molded areas defining a nonplanar three dimensional configuration, and said low melting fibers forming a multiplicity of bonds imparting shape retentive rigidity to the nonplanar three dimensional web, the low melting fibers present at one surface of the web having a fibrous form and the low melting fibers present at the opposite surface of the web having portions which exhibit a nonfibrous fused form and form said bonds.

2. A molded article according to claim 1 wherein said high melting fibers comprise the major fibrous component of the article.

3. A molded article according to claim 1 wherein said nonwoven web comprises a needled nonwoven web.

4. A molded article according to claim 1 wherein said low melting thermoplastic fibers have a melting temperature of at least 150° F. less than said high melting fibers.

5. A molded article according to claim 1 wherein said low melting fibers comprises polyethylene fibers.

6. A molded article according to claim 1 wherein said molded areas which define a nonplanar three dimensional configuration include deep drawn areas which have a density lower than in other areas of the molded article.

7. A three dimensional molded article suitable for use as fibrous surfaced panels for automobile trunk compartments and the like, and comprising a nonwoven web formed of a substantially homogeneous blend of relatively high melting polyester fibers and relatively low melting polyethylene fibers, said nonwoven web including molded areas defining a nonplanar three dimensional configuration, and said low melting fibers forming a multiplicity of bonds imparting shape retentive rigidity to the article, the low melting fibers present at one surface of the web having a fibrous form and a substantial proportion of the low melting fibers present at the opposite surface of the web having melted portions which exhibit a nonfibrous fused form and form said bonds.

8. A three dimensional molded article suitable for use as fibrous surfaced panels for automobile trunk compartments and the like and comprising a nonwoven needled web formed of a blend of a relatively high melting fibers and a relatively low melting thermoplastic fibers, said nonwoven needled web having a nonplanar three dimensional configuration, and said low melting fibers forming a multiplicity of bonds imparting shape retentive rigidity to the nonplanar three dimensional web, said bonds being assymetrically distributed throughout the thickness of the web and predominantly located closer to one surface than to the opposite surface thereof with the fibers present at said opposite surface being freely movable and presenting a felt-like fibrous textile surface to the article.

9. A molded article according to claim 8 wherein said bonds are comprised of areas in which the low melting fibers have melted and flowed and lost their fibrous form.

10. A molded article according to claim 8 wherein said low melting fibers comprise polyethylene fibers and said high melting fibers comprise polyester fibers.

11. A nonwoven sheet material adapted for being molded to form a fibrous surfaced shape retentive three dimensional molded article suitable for use as panels for automobile truck compartments and the like and comprising a movalayer coherent web consisting essentially of a blend of relatively high melting polyester fibers and relatively low melting thermoplastic fibers having a melting temperature of at least 150° F. less than the high melting fibers, and the web having an elongation in the machine and cross directions of at least 20% to enable it to be deep drawn during molding to form the three dimensional articles.

12. A sheet material according to claim 11 wherein the low melting thermoplastic fibers comprise polyethylene fibers.

13. A method of producing a shape retentive three dimensional molded article suitable for use as fibrous surfaced panels for automobile trunk compartments and the like, said method comprising
(a) forming a nonwoven web comprising a blend of relatively high melting fibers and relatively low melting thermoplastic fibers,
(b) heating one side of the web to a temperature greater than the temperature on the opposite side thereof and sufficient to melt the low melting thermoplastic fibers,
(c) compressing the heated web in a three dimensional mold to thereby form the web into a three dimensional configuration and to form bonds with the molten fibers present on the more heated surface of the web to impart rigidity and shape retentive characteristics to the molded sheet material while leaving the fibers present on the opposite surface in a fibrous form presenting a fibrous textile surface to the sheet material, and
(d) removing the molded sheet material from the mold.

14. A method according to claim 13 wherein the heating of the web comprises applying heat to both sides of the web while heating said one side of the web to a greater temperature than the opposite side.

15. A method according to claim 14 wherein said one side of the web is heated to a temperature greater than about 270° F.

16. A method according to claim 13 wherein the step of forming a nonwoven web comprising a blend of high melting fibers and low melting fibers comprises blending polyester high melting fibers and polyethylene low melting fibers.

17. A method according to claim 13 wherein the step of forming a nonwoven web comprising a blend of high melting fibers and low melting fibers comprises forming a homogeneous blend of the fibers by carding and crosslapping.

18. A method according to claim 17 wherein the forming of a nonwoven web comprising a blend of fibers included the additional step of needling the web.

19. A method according to claim 17 wherein the forming of the blend of fibers includes the additional step of applying to the homogeneous blend of fibers a face layer of fibers formed of only one of the two types of fibers.

* * * * *

UNITED STATES PATENT AND TRADEMARK OFFICE
CERTIFICATE OF CORRECTION

PATENT NO. : 4,568,581

DATED : February 4, 1986

INVENTOR(S) : Clarence A. Peoples, Jr.

It is certified that error appears in the above-identified patent and that said Letters Patent is hereby corrected as shown below:

In Claim 11, Column 8, Line 5, "movalayer" should be -- monolayer -- .

Signed and Sealed this

Thirteenth Day of May 1986

[SEAL]

Attest:

DONALD J. QUIGG

Attesting Officer

Commissioner of Patents and Trademarks